United States Patent
Ward et al.

[19]

[11] Patent Number: 6,167,286
[45] Date of Patent: Dec. 26, 2000

[54] MULTI-BEAM ANTENNA SYSTEM FOR CELLULAR RADIO BASE STATIONS

[75] Inventors: Christopher Robert Ward, Hertfordshire; Martin Stevens Smith, Chelmsford; Andrew William Jeffries, Saffron Walden, all of United Kingdom

[73] Assignee: Nortel Networks Corporation, Montreal, Canada

[21] Appl. No.: 08/868,859

[22] Filed: Jun. 5, 1997

[51] Int. Cl.[7] .................................................. H04Q 7/20
[52] U.S. Cl. ................... 455/562; 455/272; 455/273; 455/132; 455/137
[58] Field of Search ..................... 455/562, 272, 455/273, 277.1, 277.2, 132, 133, 137; 342/367

[56] References Cited

U.S. PATENT DOCUMENTS

| | | | |
|---|---|---|---|
| 5,563,610 | 10/1996 | Reudink | 455/277.1 |
| 5,581,260 | 12/1996 | Newman | 455/277.2 |
| 5,680,142 | 10/1997 | Smith et al. | 455/65 |
| 5,714,957 | 2/1998 | Searle et al. | 342/374 |
| 5,754,138 | 5/1998 | Turcotte et al. | 342/373 |
| 5,757,318 | 5/1998 | Reudink | 342/374 |
| 5,856,804 | 1/1999 | Turcotte et al. | 342/371 |

FOREIGN PATENT DOCUMENTS

| | | | |
|---|---|---|---|
| WO96/23328 | 8/1996 | WIPO | H01Q 25/00 |
| WO96/23329 | 8/1996 | WIPO | H01Q 25/00 |

Primary Examiner—Daniel S. Hunter
Assistant Examiner—Yemane Woldetatios
Attorney, Agent, or Firm—Lee, Mann, Smith, McWilliams, Sweeney & Ohlson

[57] ABSTRACT

A base transceiver station operating a sectorized cell of a cellular radio system operates a plurality of narrow uplink main receive beams, and one or a plurality of uplink diversity received beams. A scanning means scans each of the uplink main receive beams to locate a communications channel on the main uplink beams. A diversity receiver receives a diverse beam signal from the diverse beam(s), which is compared with a beam signal received from a main uplink beam, and the main beam signal from the main beam, or a diverse beam signal from the diversity antenna is selected, depending on the comparative signal to noise ratio and signal strength of the main beam signal and diversity beam signal.

30 Claims, 17 Drawing Sheets

MULTI-BEAM ANTENNA SYSTEM FOR CELLULAR RADIO BASE STATIONS

FIELD OF THE INVENTION

This invention relates to an antenna arrangement and method of operation of an antenna arrangement for use in a cellular communications system and more particularly, to an antenna arrangement and method employing diversity.

BACKGROUND TO THE INVENTION

In conventional cellular radio systems, geographical areas are divided up into a plurality of adjoining cells, in which mobile stations within a cell communicate with a base transceiver station. The frequency band within which cellular radio systems operate is limited in band width, and so available carrier frequencies need to be reused in order to provide sufficient user capacity in the system. Carrier frequencies are reused from cell to cell, and in conventional systems it is usual to divide each nominally hexagonal cell into three sectors (a trisected cell) and to use omni-directional or sectorized antennas.

There is increased capacity demand for use of cellular radio systems. In deployments where the base transceiver stations at the center of cells have insufficient capacity to deal with demand from mobile stations within cells, in order to increase call carrying capacity it is required to reduce the size of cells and create more cells of smaller area. However, creation of new cells involves creation of new base transceiver stations which has the problem of increased equipment cost, and other associated costs such as the cost of renting or buying suitable sites. Further, it is increasingly difficult to obtain planning permission for new antenna sites. Thus, any techniques which allow increase of capacity at existing base transceiver stations are important.

The type of antenna used at the base station site can potentially make significant improvements to the range and capacity of a cellular radio system. In one approach a base station antenna pattern comprises a beam of narrow angular widths as shown in FIGS. 1 and 2 herein. A narrow radiation beam 1 is directed by a base station Smart antenna 2 at a desired mobile station 3. The beam is narrow in both an azimuth and elevation planes, and tracks the mobile's movements. When compared to an omni-directional antenna, such a narrow beam has dual benefits of having high gain, leading to increased range in a thermal noise limited environment, and of rejecting interference from co-channel reuse cells, due to spatial separation of beams, thereby allowing higher capacity in a cell without cell splitting. A narrow beam has an advantage of reducing interference in a balanced manner on an uplink and a downlink path.

Where each cell has a number of smart antennas having narrow beams which track individual mobiles, there results an overall reduction in carrier to interference (C/I) ratio due to the statistical probability that different beams reusing the same carrier frequency will be pointing in different directions, having different azimuths. The likelihood of two or more beams having a same carrier frequency intercepting each other is diminished. The narrower the beams, the lower the probability that a mobile will intercept a same frequency beam of a different cell in which the same carrier frequency is re-used. Although a narrow radiation beam is formed at radio frequencies typically in the 900 MHz, 1800 MHz or 1900 MHz bands, a narrow beam can usefully be visualized as analogous to search light beams which emanate from the base station, and track the mobiles. When contrasted with an omni-directional antenna, this creates a high quality transmission path with minimal interference. For the purposes of this document, the use of the word "omni-directional" is intended to convey the meaning of having radiation coverage over an area corresponding to substantially the whole geographic area of a cell. The extent of the advantage of a narrow beam antenna over an omni-directional antenna is a function of the beam width of the narrow beam antenna. The narrower the beam width, the greater the advantage.

However, the tracking beam antenna array, whilst providing improved carrier to interference ratio is vulnerable to fading, particularly since all elements in the antenna array may be closely spaced together, and may therefore all experience fading at the same time.

In another approach, there are provided a plurality of relatively narrow beams which are spatially fixed. As a mobile moves across an area covered by a plurality of beams, the mobile must be handed over from beam to beam, and using a smart antenna arrangement, frequencies can be switched between beams to follow a mobile, so that the mobile can remain communicating on the same carrier frequency without the need to hand over to a different carried frequency. However, the smart antenna arrangement required for a switched beam approach is also susceptible to fading, for the same reasons as the tracking beams as described above.

One solution used to partially overcome the effects of fading in conventional omni-directional antennas and sectorized antennas is to employ diversity[1]. Referring to FIG. 3 herein, there is shown an example of a coverage area for a cellular radio system divided into a plurality of nominal hexagonal cells, each cell being sectorized into nominal 120° angular sectors. Examples of 120° sectors are illustrated 300, 301, 302. Conventionally, each 120° sector may employ diversity, and be served by a pair of antennas, comprising first and second antenna elements spaced apart from each other by a distance of the order of 2 to 3 meters or so. Such antenna pairs help to overcome Rayleigh fading. When one antenna is in fade, and receiving a weak signal, the other antenna of the pair may be out of fade and receiving a stronger signal. A deployment of conventional diversity pair antennas in a nominally hexagonal cell is illustrated schematically in FIGS. 4 and 5 herein. On an uplink, each antenna has a 120° wide beam of high gain sensitivity, from which it picks up signals from mobile stations within a zone covered by the beam. Beams from the two antennas overlap each other, so that a signal transmitted by a mobile station MS within a zone covered by both beams will be received by both antennas. In a tri-sectorized cell using a diversity pair antenna approach, there may be mounted a triangular support 500 on a mast 501, on each side of the triangular support, there being positioned a pair of antennas 502, 503; 504, 505; and 506, 507. A conventional diversity pair antenna arrangement comprises a main antenna 502 and a diverse antenna 503, the two antennas connected to a diversity receiver. If the antennas of an antenna pair are spaced far enough apart, any fading experienced by one antenna of the pair will be largely uncorrelated with fading experienced by the other antenna of the pair. The gain advantage which can be achieved from employing conventional diversity pair antennas is typically within the range 3 dB to about 8 dB. The conventional tri-sectorized base station antenna configuration produces an increase in carrier to interference ratio over a cellular radio system employing diverse omni-directional antennas, whilst retaining an improved signal to noise ratio by use of diversity pair antennas in each sector.

Referring to FIG. 6 herein, there is illustrated schematically a switching arrangement of a prior art antenna arrangement for a tri-sectorized cell incorporating three 120° sectors. Each sector is provided with a diversity antenna pair 600, 601, 602 respectively, each antenna comprising a main antenna and a diversity antenna. Each antenna is connected to an input of an RF switch 603 controlled by diversity radio receiver 604, which scans the received signals present on each of the diversity antenna pairs of the three sectors. Sector scanning is performed to determine when to hand over a mobile station from one sector to another. The receiver 604 receiving an RF signal from a mobile on one sector occasionally scans the antennas of the other sectors to compare the received signals strengths on those adjacent sectors, to determine when to hand over a call between sectors. An example of a prior art diversity receiver having sector scanning facility is the NT-800-DR dual mode radio unit available from Northern Telecom Limited.

Whereas antennas having broad 120° sector coverage may provide some increase in system capacity through frequency reuse, for further improving the carrier to interference ratio and hence system capacity use of multiple narrow beams in a sector, is desirable. To produce a plurality of narrow directional beams, an antenna array having plurality of antenna elements is used. The relative phase and amplitude weighting of each of the elements determine the direction and width of the beams. The antenna array is ideally as compact as possible, in order to reduce size and weight. However because such small apertures are used, the antennas are vulnerable to fading. The size and shape of array antennas which provide a narrow beam operation with up to seven or eight beams per 120° sector means that these antennas can experience fading on all beams simultaneously due to the close spacing of elements of the array antenna.

Whilst it is desirable to use a large number of narrow beams in a sector to increase capacity and it is desirable to use compact aperture antennas from the advantage of low weight and small size, there remains a fading problem in all beams in a sector simultaneously using such a configuration.

Previous solutions to fading using diversity pair antennas all have wide aperture antennas. There remains a problem of increasing system capacity by greater re-use of carrier frequencies in a narrow beam approach whilst overcoming fading in all beams of an antenna.

SUMMARY OF THE INVENTION

One object of the present invention is to provide improved carrier to interference ratio by use of multiple beams in a cell sector, whilst providing improved signal to noise ratio and avoiding of fading problems.

Another object of the present invention is to provide improved carrier to interference ratio in a base transceiver station equipment whilst maintaining acceptable signal to noise performance, and using an antenna array of relatively compact size.

According to one aspect of the present invention there is provided an antenna arrangement for a cellular radio base station, said arrangement comprising:

a main antenna and a diversity antenna; wherein at least one said antenna is configured to receive communications signals on a plurality of directional beams.

Preferably said main antenna receives a said communications signal on a plurality of said spatially distinct beams, and said antenna arrangement further comprising means for selecting from between said plurality of spatially distinct beams, a said beam providing optimal reception of the wanted communications signal.

Preferably said antenna arrangement comprises a diversity receiver adapted to combine said optimal communications signal with a communications signal received by said diversity antenna.

Suitably, a said main antenna comprises a plurality of individual antenna elements.

Said diversity antenna may comprise a plurality of antenna elements adapted to receive a said communications signal on one or more of a plurality of adjacent diversity beams defined by said plurality of antenna elements.

The plurality of directional beams may comprise orthogonal beams, or non-orthogonal beams. The plurality of beams may be directable in different directions to each other, or may be able to track a mobile station.

Preferably said means for selecting a beam comprising an optimal signal is common to both said antennas.

Preferably said means for selecting a beam receiving an optimal signal intermittently re-selects said optimal signal.

Preferably said intermittent re-selection comprises testing beams adjacent said selected beam for an optimal signal.

According to a second aspect of the present invention there is provided a method of receiving communications signals in a cellular radio communications system, the method comprising the steps of:

forming a first plurality of directional uplink beams;

receiving communications signals on said first plurality of directional uplink beams;

forming at least one second directional uplink beam;

receiving communications signals on said second directional uplink beam;

scanning across said plurality of first beams to locate a beam of said first plurality receiving an optimal communications signal.

Said method may comprise a step of comparing said communications signal received on a said located beam with a said communications signal received on said second uplink beam;

Said method may comprise a step of combining said communications signal located on said located beam with a said communications signal received in said second uplink beam.

Said method may comprise the steps of:

forming a plurality of said second uplink beams;

scanning across said plurality of second uplink beams to locate a beam of said second plurality on which said communications signal is optimally received; and comparing said communications channel received on said first located beam with said communications channel received on said second located beam.

According to a third aspect of the present invention there is provided an antenna arrangement for a cellular radio system, comprising:

a first antenna array capable of receiving first antenna signals;

a first beam former means capable of receiving said first antenna signals and outputting a plurality of first beam signals corresponding to a first plurality of beams;

a second antenna spaced apart from said first antenna, said second antenna capable of receiving second antenna signals;

a second beam former means capable of receiving said second antenna signals and outputting a second beam signal corresponding to at least one second beam;

locating means for scanning across said plurality of first beam signals to locate a communications signal received on a said directional beam; and a receiver for receiving said first and second beams signals.

Suitably, the first antenna comprises a main antenna and the second antenna comprises a diversity antenna. The receiver preferably comprises a diversity receiver.

The diversity receiver may switch to the stronger of the signals received by the main antenna or the diverse antenna, or optimally the diversity receiver could combine the signals from the main antenna and the diverse antenna. There may be a significant advantage in selecting the strongest signal from the two antennas, or combining the signals from two antennas.

Preferably said locating means operates to select a beam signal corresponding to an optimal receive beam of said first and second directional beams.

Said antenna arrangement may comprise means for comparing said first beam signals with said second beam signals.

Said antenna arrangement may comprise means for combining said first beam signals with said second beam signals.

Said second antenna may comprise a directional antenna capable of receiving communications signals on a second plurality of directional beams.

Preferably said receiver simultaneously receives a beam signal from each of said plurality of beams, and sequentially scans said beam signals of said plurality of beams.

Said first and second antennas may be physically spaced apart by a distance sufficient that when said first antenna experiences a fade, said second antenna is out of fade.

According to a fourth aspect of the present invention there is provided method of receiving communications signals in a cellular radio communications system, the method comprising the steps of:

receiving first antenna signals on a first antenna array;

inputting said first antenna signals into a first beam former means;

outputting from said first beam former means a plurality of first beam signals corresponding to a first plurality of beams;

receiving second antenna signals on a second antenna array, said second antenna array spaced apart from said first antenna array;

inputting said second antenna signals to a second beam former beams;

outputting from said second beam former means beam signals corresponding to at least one second beam;

scanning said plurality of first beam signals to locate a communications signal received on a said beam; and inputting at least one of said first and second beam signals into a receiver.

Said first plurality of beams suitably comprise a set of directional beams and a said at least one second beam may suitably comprise a single sector wide beam or a plurality of directional beams within a sector.

According to a fifth aspect of the present invention there is provided an antenna arrangement for a cellular radio system, comprising:

an antenna array capable of receiving signals from a plurality of main uplink beams, and at least one diverse uplink beam, and producing corresponding antenna signals, said main and diverse uplink beams being distinguishable from each other on a polarization basis;

beam former means for receiving said antenna signals and producing a plurality of main beam signals corresponding to said plurality of main beams, and at least one diverse beam signal corresponding to said at least one diverse uplink beam; and a locating means operating to:

scan across said plurality of main beam signals to identify a beam of said first plurality of main uplink beams on which a communications channel signal is received; and a receiver means operating to compare said communications signal received on said identified main beam with said communications signal identified on said diverse beam.

Use of a dual polarized antenna array having narrow uplink beam segregation, and coupled to a diversity receiver may allow a relatively small antenna aperture, providing an increased carrier to interference ratio, and an acceptable signal to noise ratio. A received signal may experience a first amount of fading in one polarization, and a second uncorrelated amount of fading, or no fading in another polarization. Comparison of mutually orthogonal polarizations of a received signal may enable selection of an optimum signal strength.

Preferably said antenna is capable of receiving signals on a plurality of said diverse uplink beams, and said scanning means operates to scan across a corresponding plurality of diverse beam signals to identify a beam of said plurality on which said communications signal is received.

According to a sixth aspect of the present invention there is provided a method of receiving communications signals in a cellular radio communications systems, the method comprising the steps of:

forming a first plurality of uplink beams, and at least one second uplink beam, said first and second beams being distinguishable from each other on a polarization basis;

receiving a communications channel signal on said first and second uplink beams;

scanning across said first plurality of beams to identify a beam of said first plurality on which a communications channel signal is received; and comparing said communications channel signal received on a said first identified beam with said communications signal received on a said second beam.

Preferably said polarizations are mutually orthogonal.

The method may comprise the steps of:

forming a plurality of said second uplink beams;

scanning across said second plurality of uplink beams to locate another said beam of said second plurality on which said communications channel signal is received; and comparing said communications channel signal received on said first identified beam with said communications channel signal received on said second identified beam.

According to a seventh aspect of the present invention there is provided a method of receiving communications signals from a mobile station in a cellular radio communications system, said method comprising the steps of:

forming a plurality of main uplink beams;

forming a plurality of diverse uplink beams;

selecting at least one beam from said plurality of main uplink beams and said plurality of diverse uplink beams; and inputting said selected at least one beam into a receiver.

Said plurality of main uplink beams may operate to distinguish signals of a first polarization; and said plurality of diverse beams may operate to distinguish signals of a second polarization.

The invention includes a method of receiving communications signals from a mobile station in a sectorized cellular radio communications system, said method comprising the steps of:

forming a plurality of main uplink beams in a sector;

forming at least one diverse uplink beam in said sector;

serving a said main uplink beam by monitoring signals received on said main uplink beam monitoring signals received on said diverse uplink beam; and periodically monitoring signals received on at least one said main uplink beam other than said served main uplink beam.

Said other uplink beams may comprise main beams adjacent in azimuth to said served main beam.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

Figure 7:
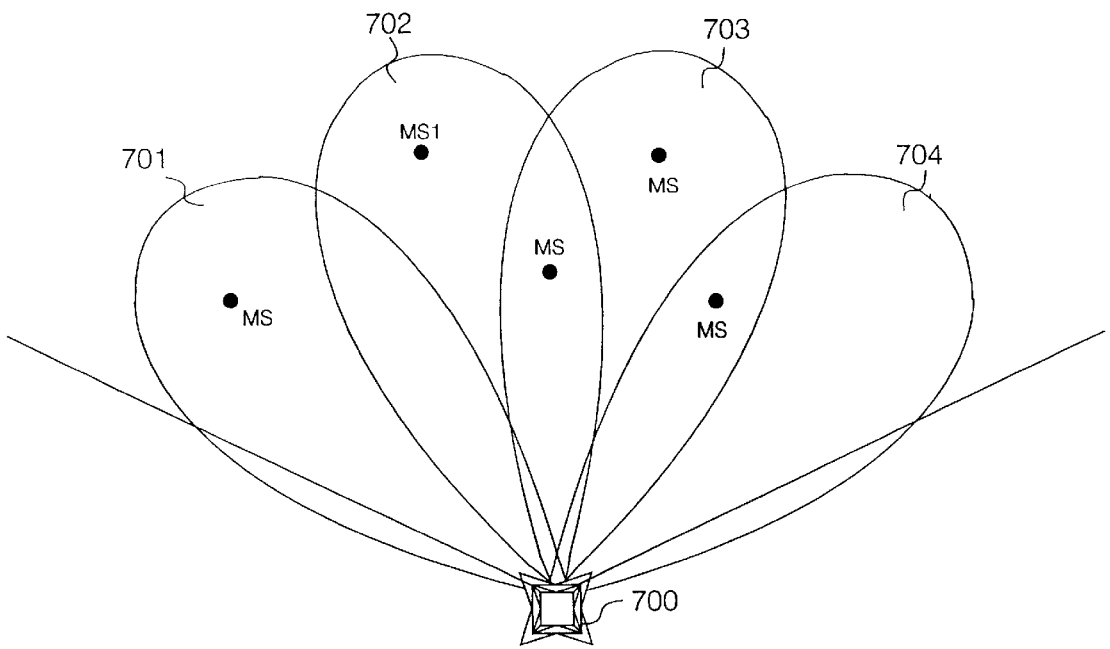
FIG. 7 herein illustrates schematically a plurality of uplink receive beams of one sector of a cellular area.

Referring to FIG. 7 of the accompanying drawings there is illustrated schematically in plan view a base transceiver station 700 at a center of a cellular area receiving signals from a plurality of mobile stations MS within a 120° sector. The base transceiver station covers three such 120° sectors in a tri-sectorized cell, however, for ease of description hereinafter methods and apparatus for operating one of those sectors will be described. It will be understood that coverage of the whole cell requires duplication of parts of the apparatus described hereinafter.

An antenna arrangement according to a specific embodiment of the present invention is capable of receiving signals transmitted by mobile stations, on a plurality of uplink receive beams 701–704. The uplink beams can be thought of as a line of sight of an antenna with respect to a specific carrier frequency. For example, if a first beam 701 is sensitive to mobile station transmission signals at a carrier frequency $f_1$, the antenna arrangement will receive with a high degree of gain, any transmitted signals at carrier frequency $f_1$ within a zone covered by the beam 701, but transmitted signals at carrier frequency $f_1$ being emitted outside the beam, either to the left or to the right in azimuth or out of range in line of sight of the beam will be only weakly received, enabling the antenna to discriminate signals from a mobile station MS1 within the beam from other interfering transmissions outside the beam. A plurality of directional relatively narrow beams enables greater frequency re-use within a cell, as compared with an omnidirectional antenna, or a broadly directional antenna having a 120° azimuth field of reception. A beam locate receiver receives signals from the antenna array corresponding to signals received on each of the plurality of beams. The beam locate receiver scans across the plurality of signals to locate a beam on which transmissions from a desired mobile station are being received.

Figure 8:
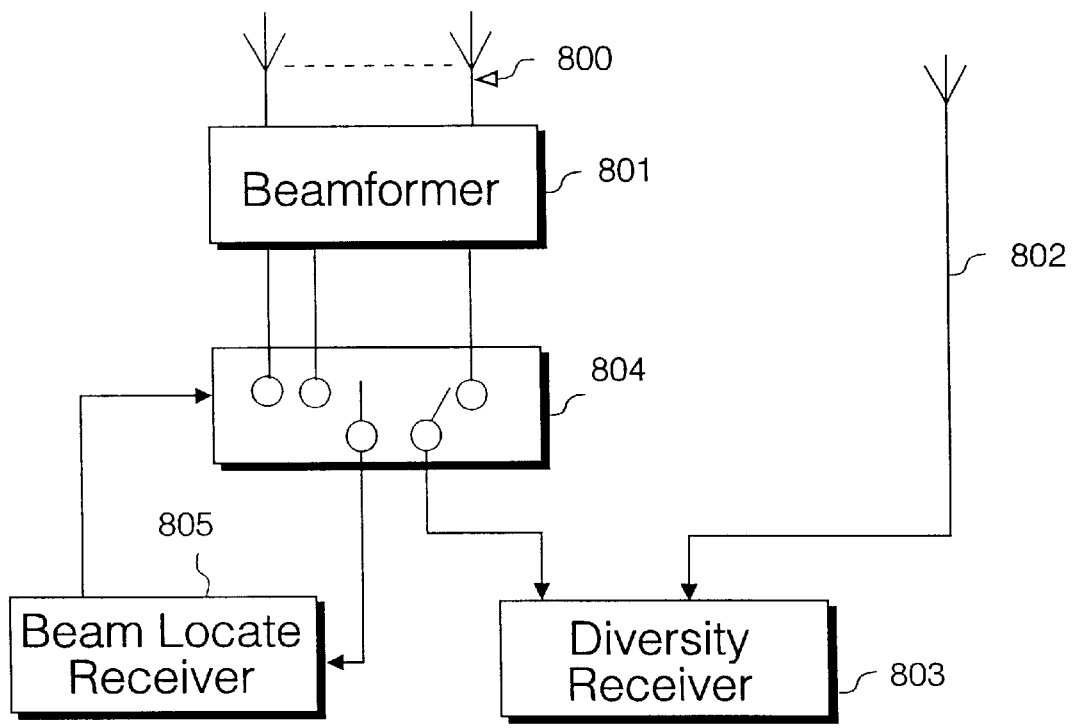
FIG. 8 illustrates schematically an architecture for a first antenna arrangement receiving a main communications signal on a plurality of main uplink receive beams, and a diverse communication signal on a diverse full sector broad diverse uplink receive beam.

Referring to FIG. 8 herein there is illustrated a first antenna arrangement according to a first specific embodiment of the present invention. The first antenna arrangement may be used to cover a cell sector, eg a 120° cell sector of a cellular area. The first antenna arrangement comprises a compact aperture multi-element main antenna array 800 capable of discriminating transmitted signals within a plurality of receive beam zones occupying a sector area, received antenna signals from the main antenna array 800 being fed through a beam former matrix 801 having a plurality of signal output ports, each signal output port outputting a beam signal received from a corresponding beam zone; a diverse antenna 802 capable of receiving signals over a whole of the sector; a diversity receiver 803 receiving an output signal from the main antenna array 800 and the diverse antenna 802, and operating to compare the two received signals and either select the strongest signal of those output from the main antenna array or the diverse antenna, or operating to combine the signals of the main antenna array and diverse antenna array; a switch control 804 operating to switch an output of the beam former 801 corresponding to one of the said plurality of beams to the diversity receiver 803; and a beam locate receiver 805 operating to scan each of the outputs of the beam former 801 for locating an output on which a received signal is present, corresponding to a signal received within a beam zone of one of the plurality of receive beams of the main antenna array 800. The beam locate receiver 805 determines the best beam for receiving a signal from a mobile station within a sector using waveform discrimination to distinguish wanted from unwanted signals, and provides a switching signal to the switch control which routes an output beam signal of the beam former corresponding to the best beam for receiving communications channel signals from the mobile station through to the diversity receiver 803.

The beam locate receiver 805 receives a main beam signal from each of the main beams, monitoring all those main beam signals, and selects a beam having a strongest signal, which is routed to the diversity receiver, 803. The diversity receiver may either combine the main beam signal with the diversity signal, eg by adding the two signals, or may select the signal having the best signal to interference and noise ratio. The beam locate receiver measures signal strength across all beams, to manage beam to beam hand-over, sector to sector hand-over, or cell to cell hand-off of a call with other cells. As a mobile approaches an edge of a cell, neighboring base stations of neighboring cells instruct their locate receivers to search for that mobile in their beams.

Figure 1:
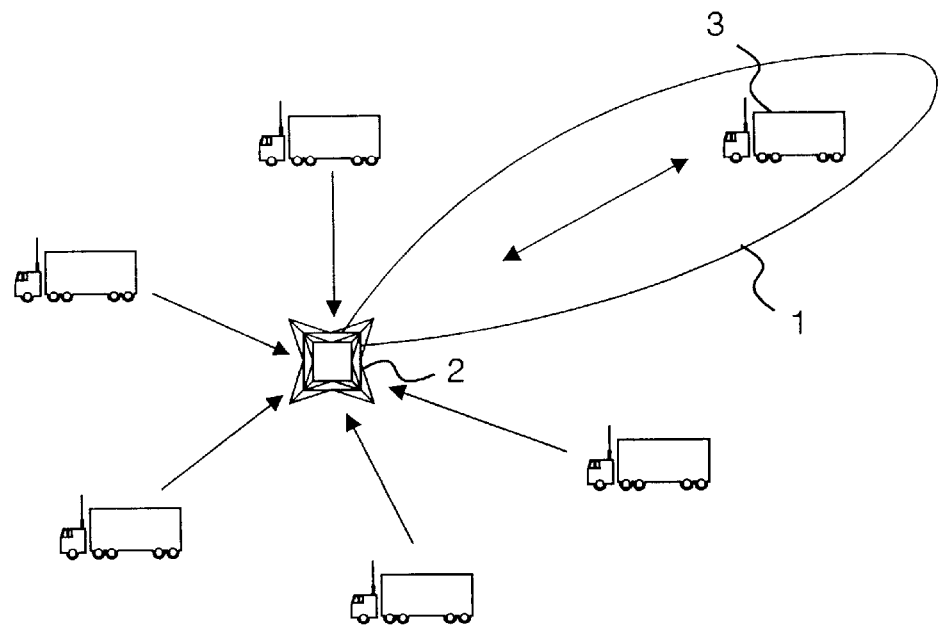
Figure 2:
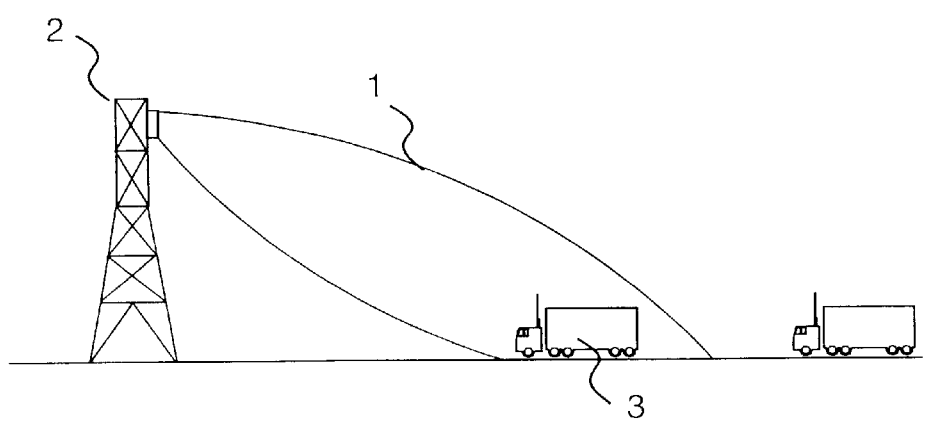
Figure 3:
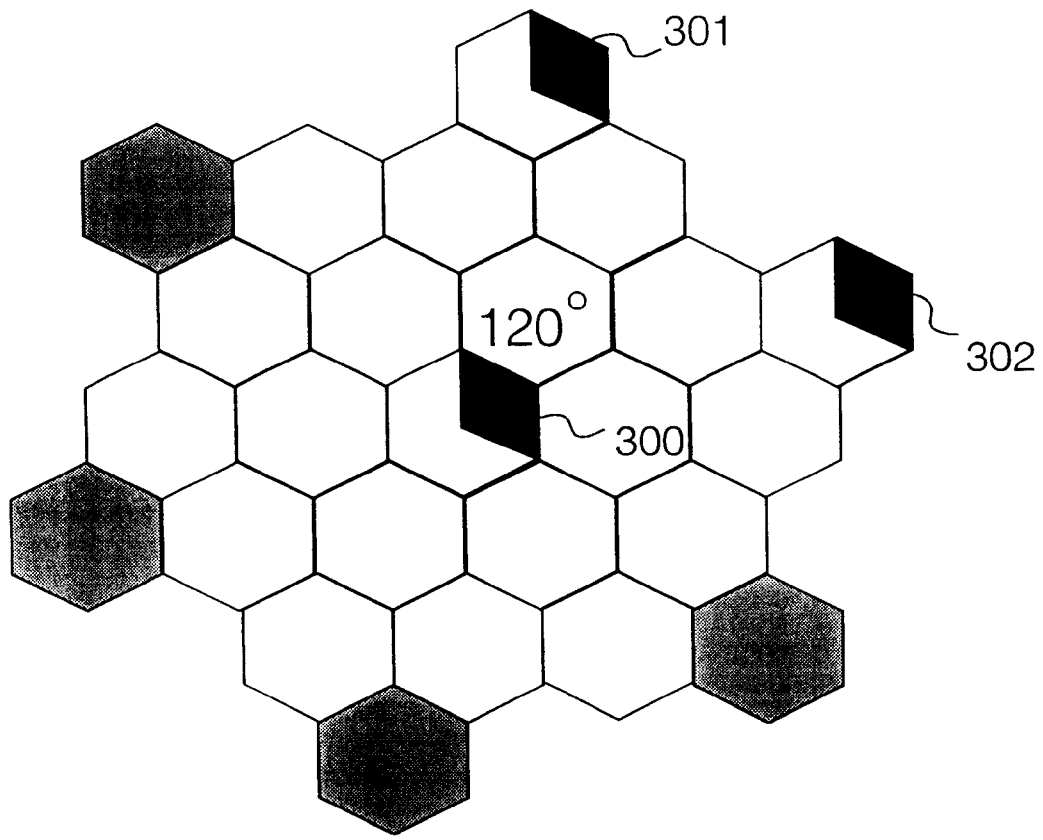
Figure 4:
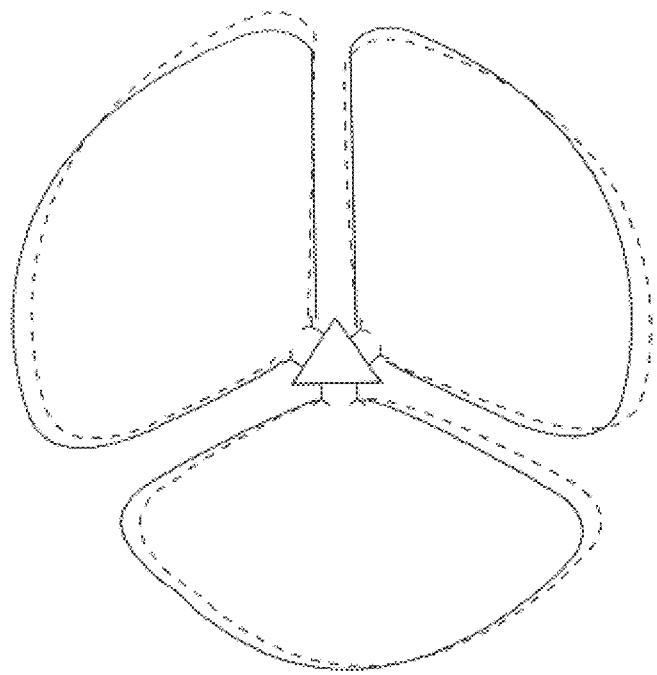
Figure 5:
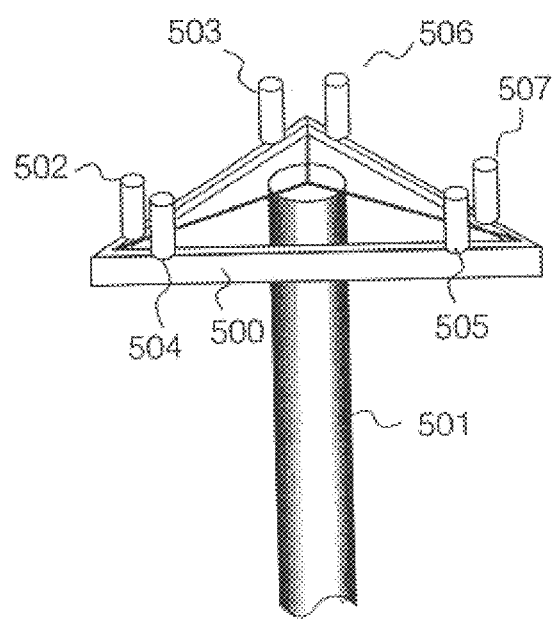
Figure 6:
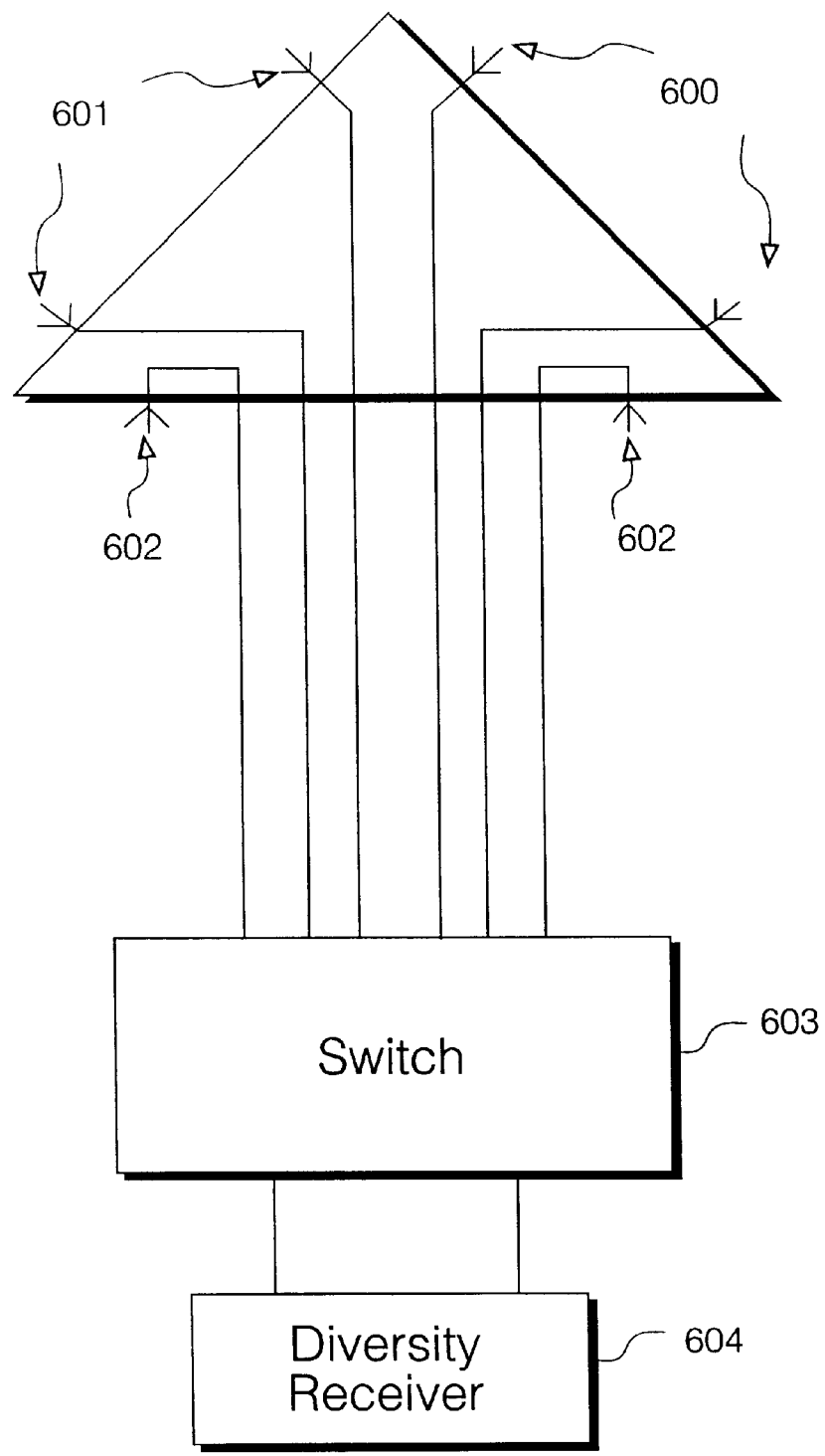

In the configuration of FIG. 8 herein, main antenna array 800 distinguishes a plurality of narrow receive beams of gain sensitivity. This may increase the carrier to interference ratio in a sector, thereby allowing greater carrier frequency reuse, and consequently increase of user capacity within a cell without the need for cell splitting. However, because the antenna array 800 has a narrow aperture, it is possible that all beams may experience a fade simultaneously. The diverse antenna 802 having a wider reception beam, is spaced apart from main antenna array 800 by a distance of 2 to 3 meters depending on the wavelength of operation, and the environment in which the antenna is situated and provides a diversity output signal for each of the signals received by each of the beams of the main antenna array 800. However, the diverse antenna 802 which is broadly directional over the whole of the sector, does not have the carrier to interference advantage provided by the first antenna array 800. It is not intuitively apparent that a combination of the multi-beam reception antenna array 800, having improved carrier to interference ratio, and the broad single beam antenna 802 providing diversity signal will provide an overall improvement of carrier to interference ratio whilst maintaining acceptable signal to noise ratio performance. However, simulation has indicated that the provision of a diversity signal from the full sector beam diverse antenna 802 gives significant gain in signal to interference plus noise ratio relative to the multi-beam main antenna array 800. Thus, the arrangement of FIG. 8 may improve overall carrier to interference ratio, whilst maintaining adequate signal to noise ratio, as compared with the prior art arrangement illustrated in FIGS. 4 to 6 herein.

The plurality of reception beams at main antenna array 800 may comprise narrow orthogonal non-overlapping beams, for example four beams occupying a 120° sector, each beam having a −4 dB beam width of around 30°. In the general case, the beam former can produce a beam pattern of an arbitrary number of beams, of various degrees of overlap or non-overlap. In this specification, the term orthogonal is construed in accordance with its meaning as described in "Introduction to Antennas" by M S Smith[2], and non-orthogonal is construed accordingly.

Figure 9:
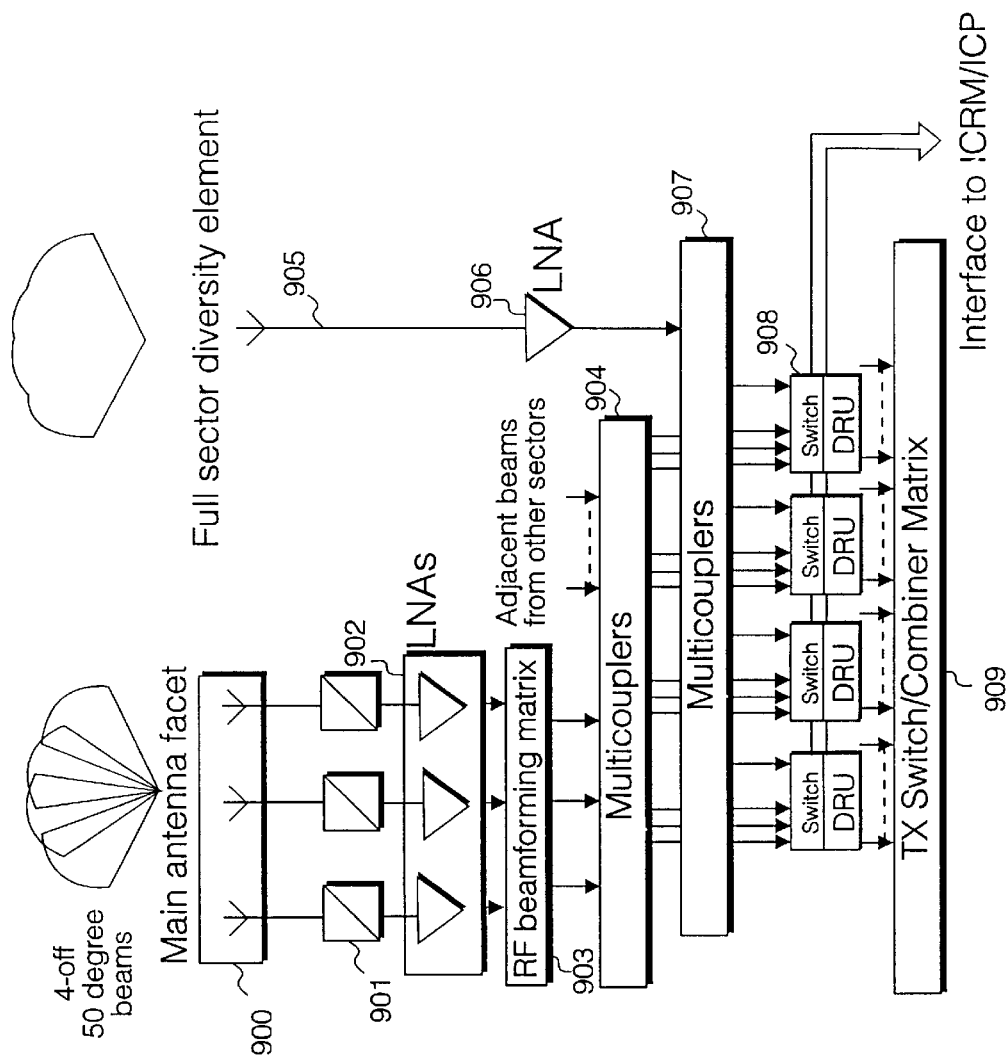
FIG. 9 illustrates schematically a second antenna arrangement receiving communications signals on a plurality of main uplink receive beams, and on a diverse uplink receive beam, the main uplink receive beams and diverse uplink receive beam formed by spaced apart main and diverse antennas.

Referring to FIG. 9 herein, there is shown a second antenna arrangement according to a second specific embodiment of the present invention. The second antenna arrangement comprises on an uplink path, a main multi-element antenna array 900 operating a plurality of overlapping receive beams covering a sector of a cell; a plurality of diplexors 901, for separating out received antenna signals of the antenna array; a plurality of linear amplifiers 902 for amplifying the received antenna signals, each linear amplifier receiving a respective antenna signal from a corresponding respective said diplexor; a beam forming matrix 903 receiving the amplified antenna signals; a plurality of multi-couplers 904 inputting beam signal/s corresponding to the plurality of beams from the beam forming matrix 903, and also inputting similar beam signals from other antenna arrays covering other sectors of the cellular area; a diversity antenna 905 operating a full sector receive beam and capable of receiving transmissions from mobile station signal sources within the sector; an amplifier 906 for amplifying a received beam output from the diversity antenna 905; a second plurality of multi-couplers 907, receiving a diversity beam signal from the diversity antenna 905; a plurality of switches and digital radio units 908 receiving signals from the multi-couplers 904, 907, the digital radio units operating to compare the beam signals received from the multiplicity of beams with a diversity signal received from the diversity antenna 905 and to switch an appropriate selected signal to transmitter switch/combiner matrix 909 which routes the call through to an appropriate beam formed by the transmit chain. Each main beam feeds a main beam signal to a corresponding respective digital radio unit 908, the arrangement being that each digital radio units serves a respective main beam. Each digital radio unit also receives the diversity beam signal from the full sector diversity beam, as well as receiving a main beam signal from the beam which it serves, and the diversity beam signal. Each digital radio unit also receives a signal from main beams either side of its served main beam. For radio units serving a main beam at the edge of a sector, these radio units have access to a main beam signal from a main beam at an edge of the adjacent sector. Thus, in the case of a four uplink beam arrangement, each of the four corresponding radio units has four inputs, one from the corresponding main beam served by the radio unit, one from the diverse beam, and one from each of the main beams adjacent in azimuth to left and right of the main beam served by the radio unit. Each digital radio unit periodically monitors the signals received on the adjacent main beams, and compares these with the signal received from the main served beam. If a signal received on an adjacent beam is stronger than the signal received on the main served beam, then the radio unit initiates a hand-over of call to the radio receiver which has the adjacent uplink beam with the stronger signal as its own main served beam. The digital radio units manage beam to beam hand-over of a call on an uplink path, depending on which beam a strongest signal for a call is received.

Figure 10:
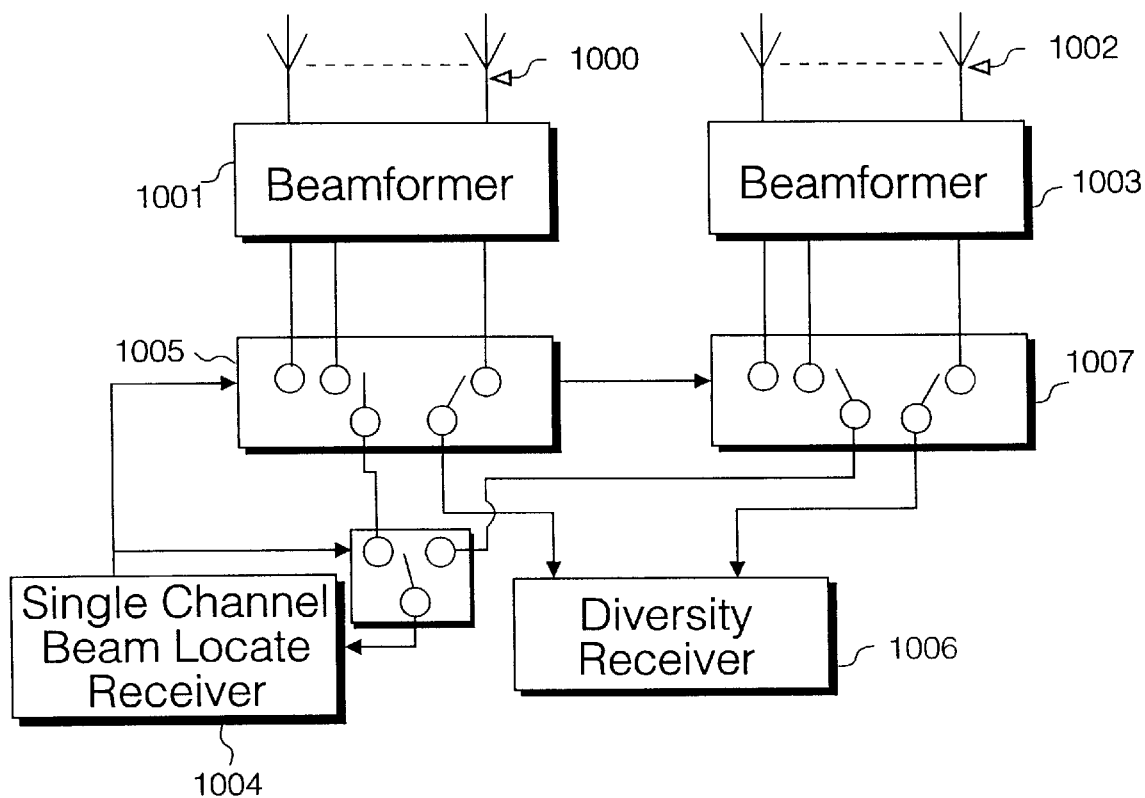
FIG. 10 illustrates schematically a third antenna arrangement having a main antenna array and a diverse antenna array spaced apart from each other, the main antenna array receiving communications signals on a plurality of main receive beams, and the diverse antenna array receiving signals on a plurality of diverse uplink signal beams.

Referring to FIG. 10 herein, there is illustrated a fourth antenna arrangement according to a fourth specific embodiment of the present invention. The fourth antenna arrangement comprises a multi-element main antenna array 1000 capable of receiving signals from a plurality of receive beams covering a sector; a main beam former 1001 receiving antenna signals from the main antenna array 1001; a diversity antenna 1002, comprising a multi-element antenna array capable of receiving diversity signals from a plurality of directional receive beams; a diversity beam former 1003 receiving antenna signals from the diversity antenna 1002; a single channel beam locate receiver 1004 operating to scan across a plurality of output ports of the main beam former 1001 and diverse beam former 1003 to locate a signal on a corresponding receive beam of the main antenna 1001 or diverse antenna 1002; a switch control device 1005 for switching a beam signal output of the main beam former 1001 to a first input of a diversity receiver 1006; a diversity switch control 1007 for switching a diversity signal received on a corresponding receive beam of the diversity antenna 1002, the diversity switch control 1007 selecting the signal from a plurality of output ports of the diversity beam former 1003, the diversity switch control 1007 receiving a switch signal from the main switch control 1005, the diversity switch control operating to switch a received beam signal from an output port of diversity beam former 1003 according to the control signal received from main switch control 1005, the diversity receiver 1006 receiving the diversity beam signal from the diversity switch control 1007.

The single channel beam locate receiver 1004 locates a transmission from a mobile station in a beam zone corresponding to a received beam of the main or diverse antenna 1000, 1002, and operates the main switch control 1005 to connect a corresponding beam signal present at an output port of main beam former 1001 or diverse beam former 1003 to an input of the diversity receiver 1006. The main switch control 1005 sends a signal to the diversity switch control 1007 to switch a corresponding output port of the diversity beam former 1003, which corresponds to a diversity receive beam which overlaps in pointing angle but which is spatially offset to the main received beam on which the signal from the mobile station is being received. The diversity beam signal on the corresponding overlapping diversity receive beam is switched to another input port of the diversity receiver 1006. The diversity receiver compares the beam signals from the main beam and from the corresponding diversity receive beam and selects the highest quality signal of those two signals, or alternatively combines those two signals. The beam locate receiver 1004 sequentially scans each of the beams issuing from the main antenna 1000 and diversity antenna 1002 in order to locate communications channels signals of mobile stations. The switch control 1005 controls the diversity switch 1007 to inspect beam signals from the corresponding diversity beam overlapping the main beam, such that the main beams and diversity beams are scanned together with the main beam and the corresponding overlapping diversity beam being inspected by the diversity receiver simultaneously as the beam locate receiver scans across the plurality of main beams.

Figure 11:
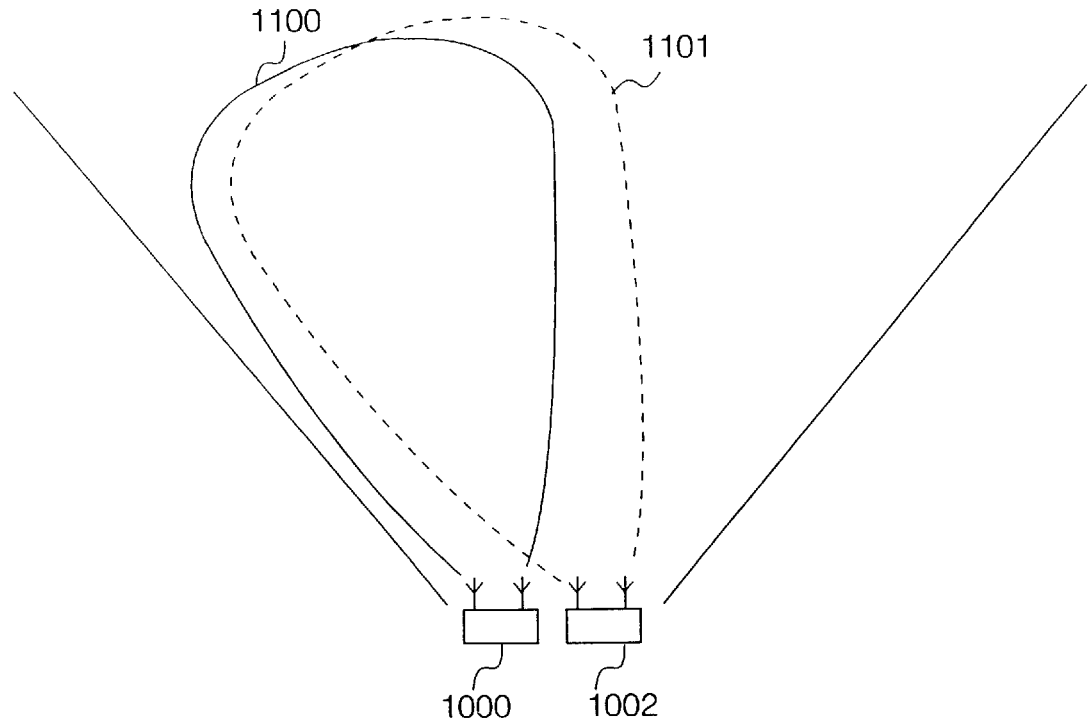
FIGS. 11 and 12 illustrate a beam scanning method operated by the third antenna arrangement.
Figure 12:
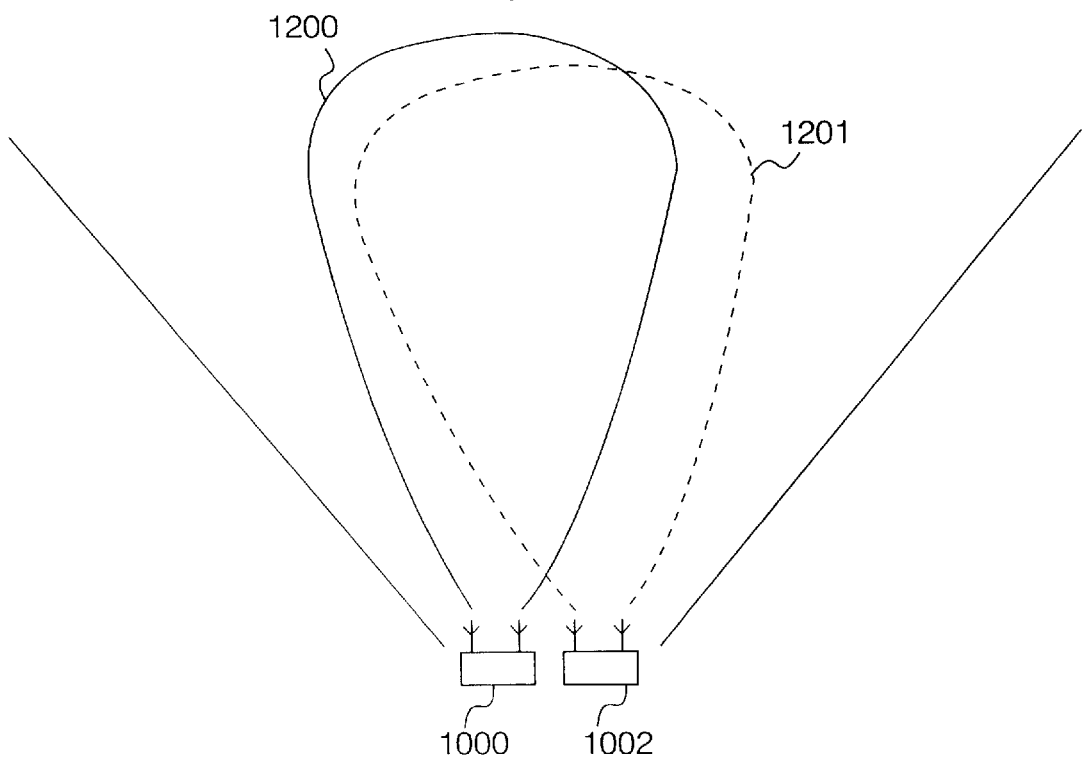

Referring to FIGS. 11 and 12 herein, there is shown part of a sequence of beam scanning across the plurality of main beams and the corresponding plurality of diversity beams from the main antenna 1000 and diversity antenna 1002. In FIG. 11 a first main beam 1100 is selected by the locate receiver, and switch 1005 at the same time as corresponding spatially overlapping offset first diversity beam 1101. In FIG. 12 the next one of the plurality of main beams in the sector is selected, and the corresponding diversity receive beam of diversity antenna 1002 is scanned at the same time, beam signals from each of these beams being fed into diversity receiver 1006.

The beam locate receiver may scan across the beams in sequence so that the receiver samples ones of the main and diverse beams in turn.

Figure 13:
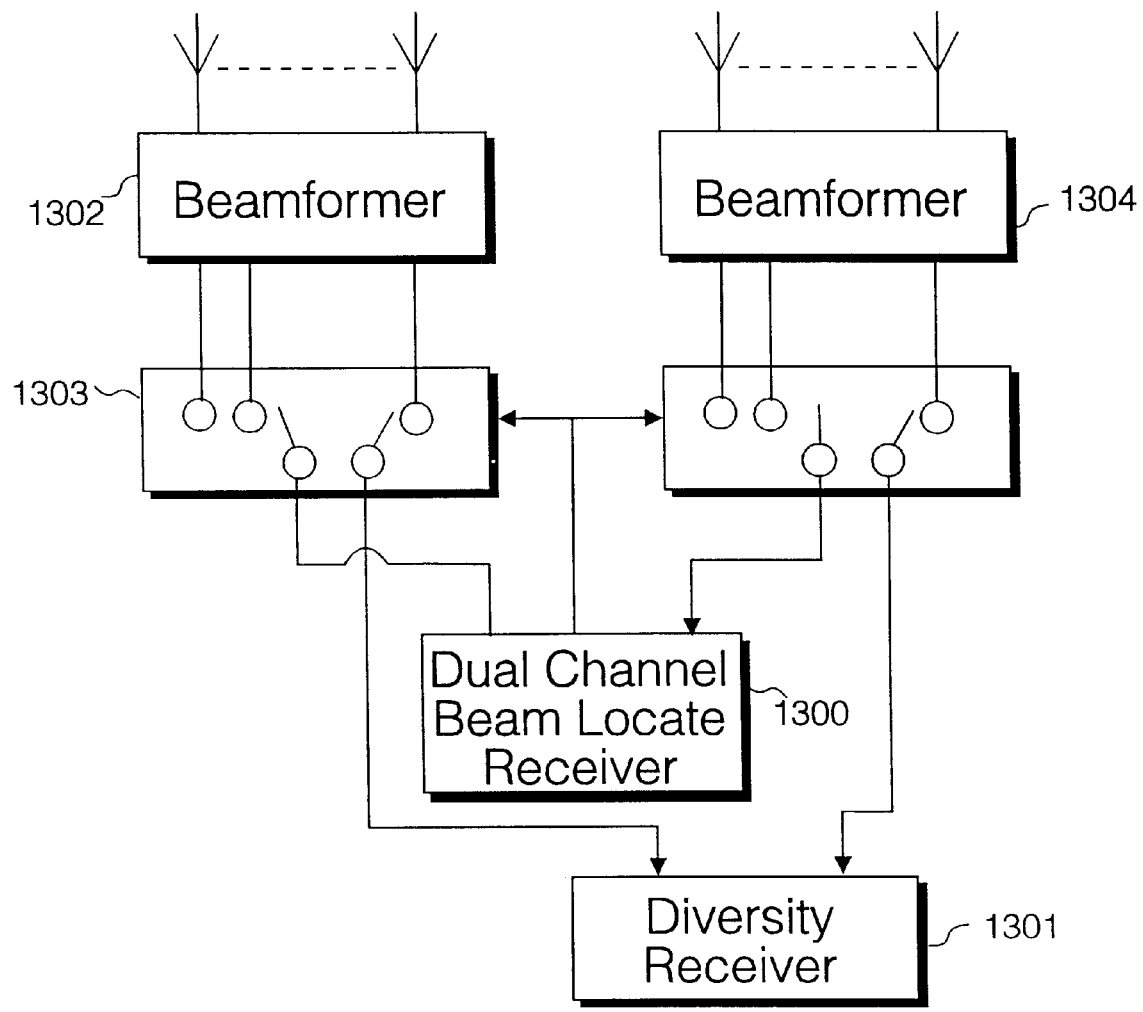
FIG. 13 illustrates schematically a fourth antenna arrangement having main antenna array and diverse antenna array spaced apart from each other, wherein a plurality of main uplink receive beams are scanned and a plurality of diverse uplink receive beams are scanned.

Referring to FIG. 13 herein, there is illustrated a fifth antenna arrangement according to a fifth specific embodiment of the present invention. The fifth antenna arrangement operates substantially similarly to the fourth antenna arrangement, however a dual channel beam locate receiver 1300 is provided which determines a pair of beams, ie a main beam and a corresponding diversity beam providing the best signal performance, wherever those beams may be directed. The beam locate receiver 1300 scans each of a plurality of main beam signals output by main beam former 1302 and switches a beam signal corresponding to a required mobile station to diversity receiver 1301 via main switch 1303 and simultaneously scans a plurality of diverse receive beams, by inspecting corresponding diverse beam signals output from diverse beam former 1304 and selects a beam giving a strongest signal corresponding to the located mobile station. The beam locate receiver controls diverse switch 1305 to switch the selected beam signal to diversity receiver 1301. The beam locate receiver can monitor main and diverse beams either synchronously or asynchronously. Alternatively, the beam locate receiver can operate in a dual channel diversity mode to improve the beam selection performance.

Figure 14:
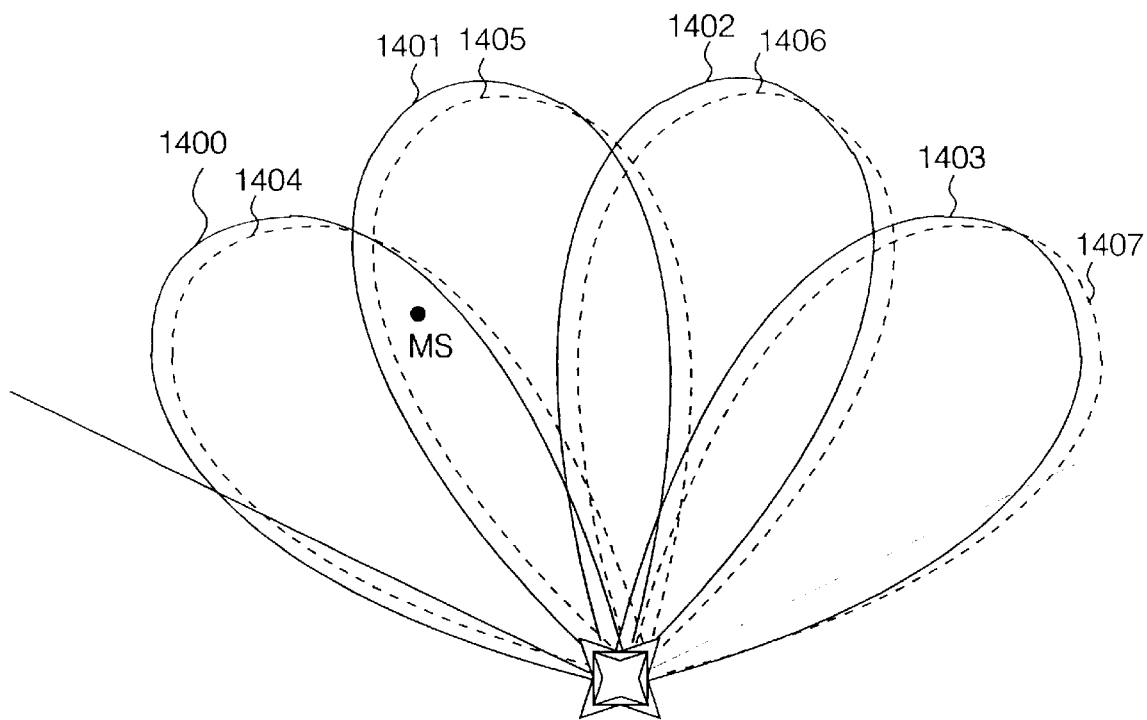
FIG. 14 illustrates schematically a plurality of overlapping main uplink beams and overlapping diverse uplink beams, wherein individual ones of the main uplink beams overlap each other and individual ones of the diverse uplink beams overlap each other, and the diverse uplink beams overlap the main uplink beams.

An example of operation of the fifth antenna arrangement of FIG. 13 is illustrated in FIG. 14 herein, in which a plurality of main beams 1400–1403 heavily overlap each other, having an azimuth beam width of around 50° each, four beams covering a 120° sector, and a plurality of diversity received beams 1404–1407 overlap the plurality of main beams spatially. For example a mobile station MS may fall within an overlap region of first main beam 1400, a second main beam 1401, a first diversity beam 1404, and a second diversity beam 1405. The signal received on the first main beam 1400 may be stronger than that received on the second main beam 1401, whereas the diversity signal received on the second diversity beam 1405 may be stronger than that received on the first diversity beam 1404. Under these circumstances, the beam locate receiver 1300 may select a main beam signal corresponding to first main beam 1400 and a diversity signal corresponding to second diversity beam 1405 for routing to diversity receiver 1301.

In general, adjacent beams may fade together. However, if significant angle scatter is present, independently fading signals received in different beams, can occur sometimes, but rarely. Selecting different main and diverse beams under these circumstances can have an advantage. Such operation may be worthwhile in a situation where the mulitpath environment is subject to high angle spread or scatter.

Figure 15:
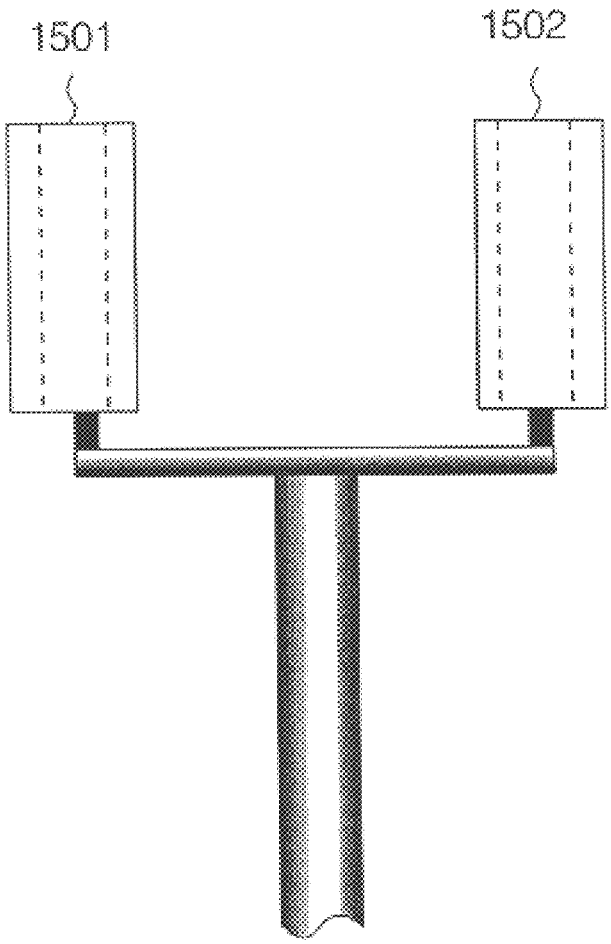
FIG. 15 illustrates schematically the main antenna array and diversity antenna array of the fourth antenna arrangement of FIG. 14.
Figure 16:
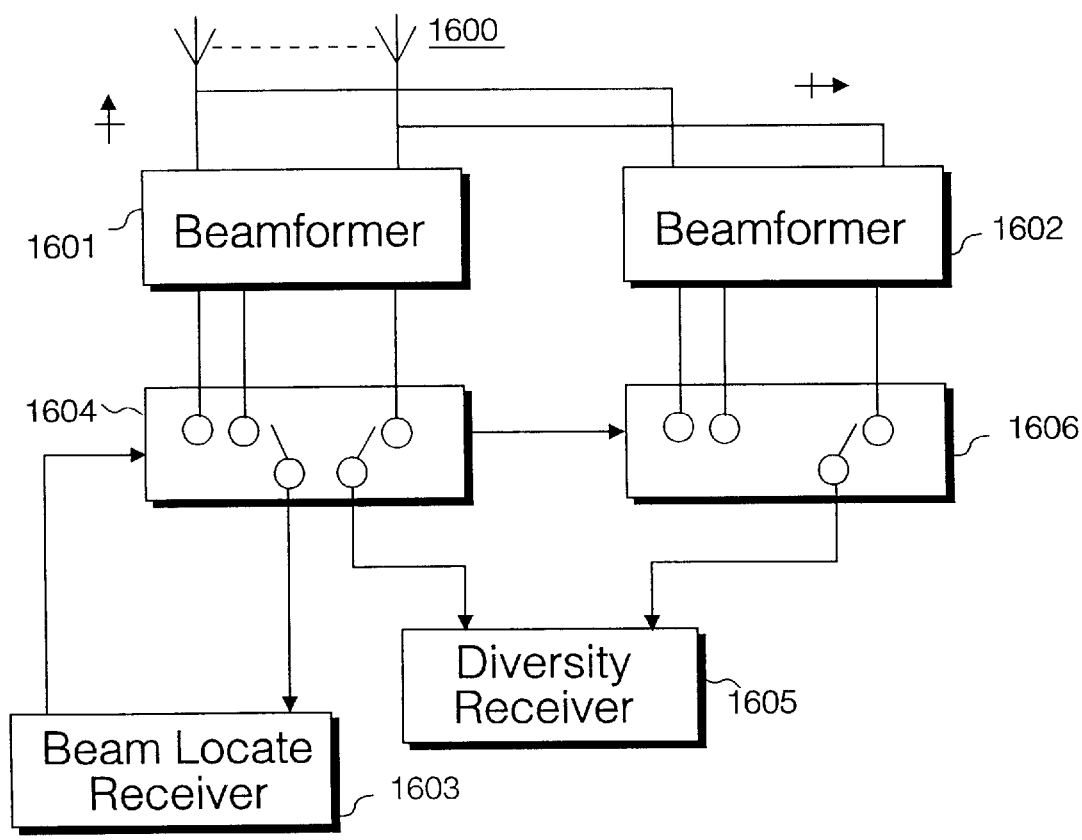
FIG. 16 illustrates schematically a fifth antenna arrangement wherein a single aperture antenna array receives communications signals on a plurality of main uplink beams operating on a first polarization, and on a plurality of diverse uplink beams operating on a second polarization.

Referring to FIG. 15 herein, there is illustrated schematically the main antenna and diversity antenna of the fifth antenna arrangement of FIG. 16 in situ on top of a mast. Since the main antenna and diversity antenna comprise multi-element antenna arrays, their size will be larger than a corresponding omni-directional antenna (relative size of omni-directional antenna shown dotted). The main antenna 1501 and diversity antenna 1502 are spaced apart by a distance of typically around 2 to 3 meters, such that when all the main beams are in fade, the distance between the main antenna array and diversity antenna array is such that the fading experienced by the diversity antenna may be uncorrelated with that experienced by the main antenna. However, as mentioned previously obtaining planning permission for erection of antenna arrays and masts is difficult, and increasing the size of antenna arrays is a disadvantage from the cost and planning point of view, as well as experiencing increased technical problems due to increased wind resistance and increased bulk. Ideally the facets of the multi-element antenna arrays would be made as slim as possible.

Referring to FIG. 16 herein, there is illustrated a sixth antenna arrangement according to a sixth specific embodiment of the present invention. The sixth antenna arrangement comprises a single antenna array 1600 comprising a plurality of antenna elements capable of discriminating signals of a plurality of mobile stations by polarization; a first uplink beam former 1601 capable of receiving first polarized antenna signals from the antenna array 1600; second uplink beam former 1602 capable of receiving second polarized signals from the antenna array 1600; said first beam former 1601 outputting a plurality of first polarization beam signals from a corresponding plurality of output ports of the first beam former 1601, and the second beam former 1602 outputting a second plurality of polarization beam signals from a plurality of output ports of the second beam former 1602, said plurality of polarization beams signals corresponding to a plurality of main receive beams sensitive to signals in said first polarization, and said second beam former outputting said second polarization beam signals corresponding to a set of diverse receive beams, sensitive to receive signals of a second polarization; a beam locate receiver 1603 operating to scan said output ports of first beam former 1601 to locate a beam signal carrying a received signal from a mobile station within a sector covered by said beams, the beam locate receiver operating a main switch 1604 to switch a said first polarization beam signal to a first input port of diversity receiver 1605, the main switch 1604 generating a control signal received by a diversity switch 1606, the diversity switch 1606 receiving a plurality of second polarization beam signals from second diversity beam former 1602, said diversity switch 1606 selecting a diverse beam signal of a second polarization, corresponding to said diverse beams of said second polarization, corresponding to the beam signal received from the main beam of said first polarization; said diverse beam signal being switched by said diversity switch 1606 into a second input port of said diversity receiver 1605, the diversity receiver 1605 operating to compare the main beam signal and diverse beam signal and either select the stronger of the main signal and the diverse signal, or to combine the main signal and diverse signal to produce an output signal.

Figure 17:
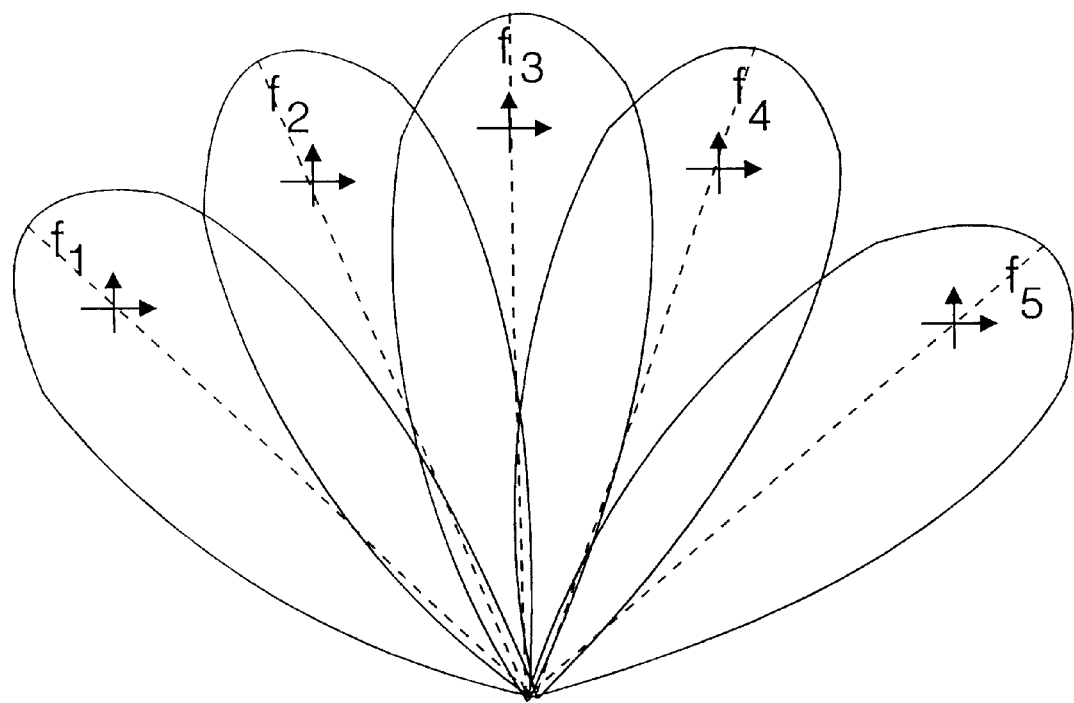
FIG. 17 illustrates schematically an uplink beam pattern of the fifth antenna arrangement, wherein each uplink beam is segregated in terms of polarization.

Referring to FIG. 17 herein, there is illustrated a beam pattern of the polarization antenna array 1600. The beam pattern comprises a plurality of relatively narrow beams in azimuth, occupying a 120° sector of a cellular radio area. Typically a plurality of narrow beams may occupy a 120° sector. A main plurality of beams comprise beams of sensitivity to signals of a first polarization, whereas a diverse plurality of beams, occupying co-spatially with corresponding respective said main beams are sensitive to signals of a second polarization. Each of the main beams operates at a different carrier frequency, being a same carrier frequency at which each of the corresponding respective diverse beams of the second polarization operate.

A signal transmitted at arbitrary polarization by a mobile station and which may suffer significant polarization mixing in the propagation path falls within one of the beams and may result in a stronger received signal in the first polarization than the second polarization or vice versa, depending upon local conditions within the sector. The main beams operating at the first polarization may be used to derive main beam signals, whereas the diverse beams operating in the second polarization may be used as the diverse beams. The first and second polarization are preferably orthogonal to each other, and may comprise linear polarizations, or opposite circular polarizations, or any combination of different polarizations, eg linear polarization and circular polarization.

The antenna array 1600, receptive to first and second polarization signals, may comprise a plurality of individual antenna elements in a single antenna element array. This has an advantage of having a relatively compact aperture compared to two spaced apart antennas, eg a main antenna and a diverse antenna spaced apart typically by a distance of 2 to 3 meters depending on operational wavelength used and environment. Because the received signals are discriminated from each other by means of polarization, when one polarization is in fade, the other polarization may be less severely in fade, or not in fade, even though the elements of the antenna are compactly arranged. By providing a main beam pattern and a diverse beam pattern differentiated by means of polarization, it may be possible to provide a compact antenna having multiple narrow beams, thereby increasing carrier to interference ratio, and also having compact aperture area, thereby incurring fewer problems with planning permission, windage, weight and cost, whilst still maintaining an adequate signal to noise ratio advantage through the use of diversity.

Each of the beams can be scanned firstly on its first polarization, and secondly on its second polarization before moving on to the next beam, in order to locate a wanted signal and its corresponding diverse signal. Scanning to locate a wanted signal can operate in a variety of different ways. For example, a first polarization of each beam can be scanned, the beams being scanned in sequence, and then the second polarization of each beam can be scanned. Alternatively, a first polarization of one beam can be scanned followed by a second polarization of that beam, before scanning the next adjacent beams first polarization and then the next adjacent beams second polarization. In general, the first and second polarizations of the beams can be scanned in any order, for example randomly or in accordance with a predetermined scanning algorithm.

Figure 18:
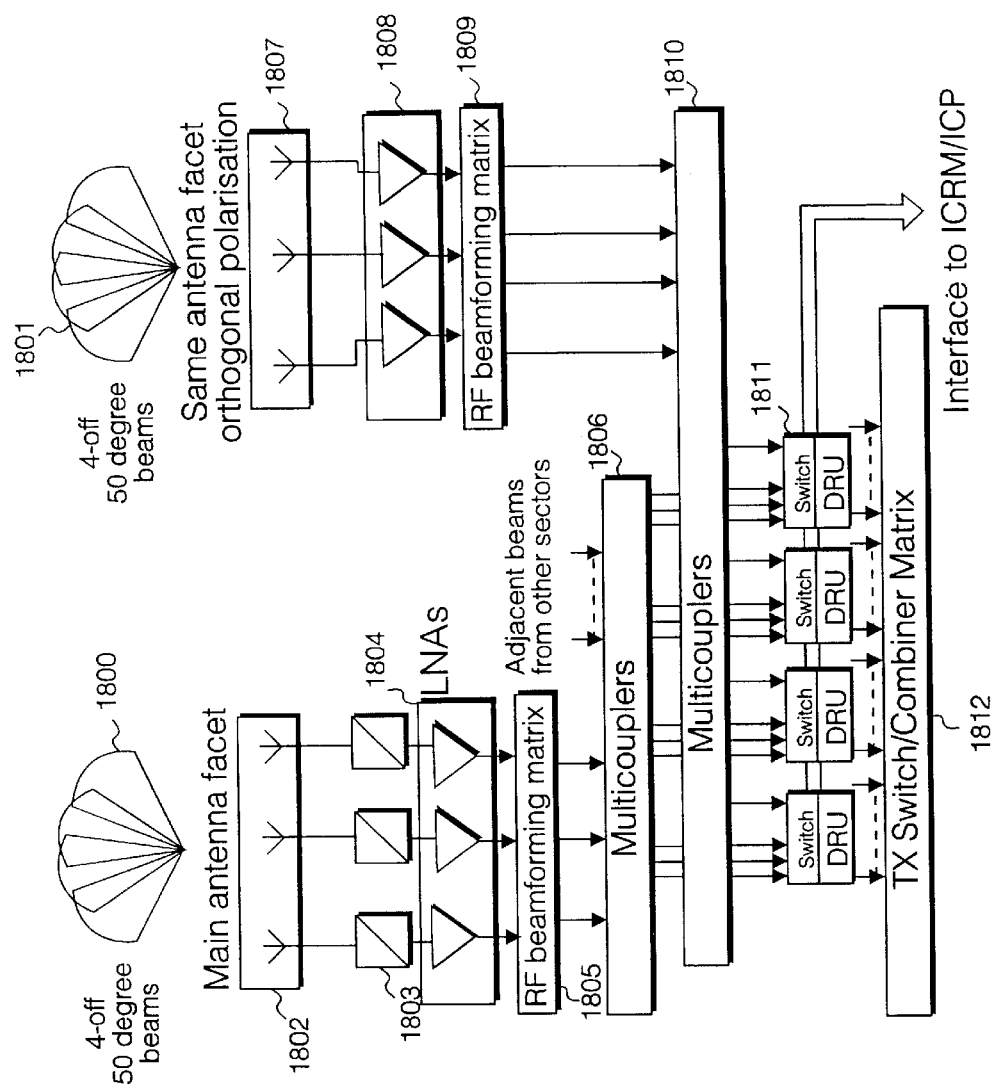
FIG. 18 illustrates schematically a more detailed implementation of the fifth antenna arrangement of FIG. 16.

Referring to FIG. 18 herein, there is illustrated an implementation of polarized diversity narrow beams in a seventh antenna arrangement according to a seventh specific embodiment of the present invention. The seventh antenna arrangement receives signals from a first plurality of main receive beams 1800 receptive to a first polarization, and a corresponding plurality of spatially overlapping diversity receive beams 1801 receptive to a second polarization. The seventh antenna arrangement comprises a main antenna array 1802 comprising a plurality of antenna elements, each antenna element issuing a antenna signal to a corresponding respective diplexor of a plurality of diplexors 1803, each of the diplexors splitting off the received antenna signal and feeding the received antenna signal into a corresponding linear amplifier of a plurality of linear amplifiers 1804, which output amplified received antenna signals into main uplink beam forming matrix 1805, main uplink beam forming matrix 1805 comprising a plurality of output ports each outputting a corresponding uplink received beam signal, corresponding to a respective beam of the plurality of main beams 1800, the uplink beam signals being input into a plurality of multi-couplers 1806 along with other beam signals from other main antennas of other sectors of a cell;

a diversity antenna 1807 comprising a multi-element array, the diversity antenna receiving signals from a plurality of directional diversity receive beams 1801, each said element of the diversity antenna generating a corresponding respective diversity antenna signal, the diversity antenna signals input to a plurality of linear amplifiers 1808, the linear amplifiers outputting amplified diversity antenna signals into input ports of a diversity beam forming matrix 1809; the diversity beam forming matrix 1809 having a plurality of output ports corresponding to respective receive beams covering the sector, said diversity beam signals output from the diversity beam forming matrix 1809 being input to second plurality of multi-couplers 1810; a plurality of switches and digital radio units 1811 receiving signals from the first and second plurality of multi-couplers, corresponding to signals received on each of the main receive beams and diversity receive beams; the digital radio units 1811 outputting signals to a transceiver switch/combiner matrix 1912, which then get routed to a corresponding beam formed on the downlink, or antenna.

The main antenna array 1802 and diverse antenna array 1807 are combined into the same antenna aperture, and are not spaced apart by a large distance. Elements of the main and diverse antenna arrays are close to each other, within the distance of a few wavelengths, and can be co-located.

Figure 19:
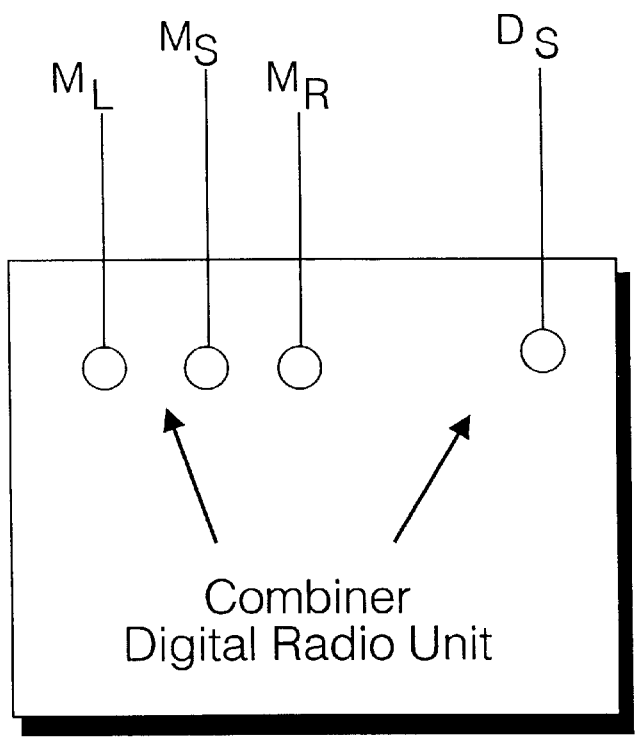
FIG. 19 illustrates a switch for selecting between a main served beam signal, left and right adjacent main beam signals, and a diverse beam signal.
Figure 20:
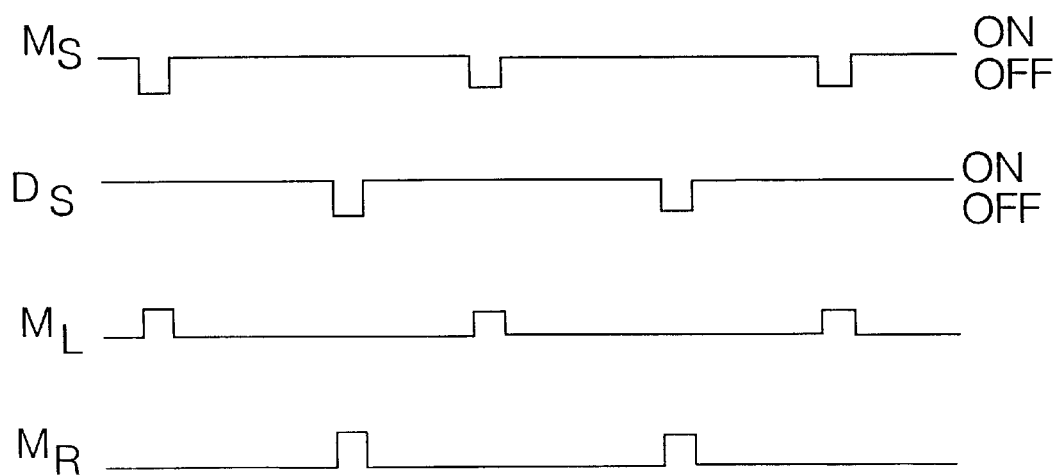
FIG. 20 illustrates a first monitoring scheme for monitoring a main served beam, left and right main beams adjacent the main served beam, and a diverse beam.

Referring to FIGS. 19 and 20 herein, there is illustrated operation of a digital radio unit of the embodiments of FIG. 9 or 18. Each digital radio unit serves a corresponding respective main beam. The digital radio unit receives a signal from its main served beam $M_s$. Reception of the main served beam $M_s$ is shown as a function of time in the upper part of FIG. 20. For most of the time, the digital radio unit connects to the main served beam $M_s$ but periodically disconnects from the main served beam and connects to a signal from an adjacent main beam, for example an adjacent beam to the left of the main serving beam $M_L$, to test whether the signal on the left adjacent beam $M_L$ is stronger than the signal received on the main serving beam $M_s$. The digital radio unit also connects to a diverse serving beam $D_s$, for most of the time, but periodically switches to connect to another main beam adjacent to the main serving beam, for example the beam to the right of the main serving beam $M_R$. The digital radio unit monitors the adjacent left main beam $M_L$ and adjacent right main beam either side of the main serving beam $M_s$, testing for a higher strength signal from a mobile station on either of the adjacent left or adjacent right main beams to a main serving beam, whilst simultaneously receiving a signal from the diverse serving beam $D_s$.

In the case of the second antenna arrangement of FIG. 9 herein, there are a plurality of adjacent main beams in a sector spatially overlapping in azimuth with a full sector diversity beam. In this case, the serving diverse beam $D_s$ is the full sector diversity beam and the main serving beam can be any of the plurality of main beams in a sector. At the edges of a sector, the adjacent main beam may be a main beam from an adjacent sector, and the digital radio unit may monitor a main beam of an adjacent sector.

In the fifth antenna arrangement of FIG. 18, there are plurality of main beams and a plurality of diverse beams in a sector. Under these circumstances, signals from the main serving beam and diverse serving beam are input into the digital radio unit, and the digital radio unit periodically monitors main beams adjacent either side of the main serving beam to determine whether a stronger signal can be obtained on those beams.

Figure 21:
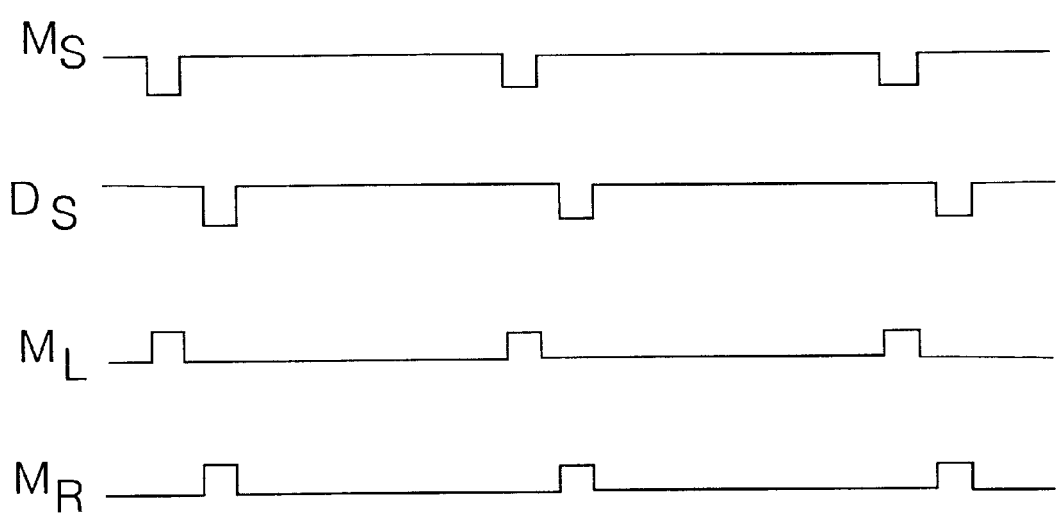
FIG. 21 illustrates a second monitoring scheme for monitoring a main served beam, left and right main beams adjacent the main served beam, and a diverse beam.

Referring to FIG. 21 herein, there is shown an alternative monitoring pattern in which switching between the main serving beam $M_s$ and adjacent left main beam $M_L$ is followed immediately, or within short succession by switching from the diverse serving beam to monitor the adjacent right main beam $M_R$, before reverting to selection of the main serving beam and diverse serving beam. Periodically, the adjacent left and adjacent right main beams are monitored by switching from the main serving beam and diverse serving beam.

The digital radio units continuously scan other adjacent main beams in the sector, to determine if a stronger signal can be obtained on a beam other than the beam currently operating as the main serving beam. The digital radio unit substantially continuously receives a signal from a diverse beam, and can combine the signals from the main serving beam $M_s$ and diverse serving beam $D_s$. If the DRU detects a stronger signal level in an adjacent main beam, then it initiates a hand-over of the call so that the adjacent beam becomes the serving beam (ie the call is routed from the current DRU to a DRU which uses the adjacent beam as the serving beam).

REFERENCES

[1] "Mobile Communications Engineering", McGraw Hill, 1982, Ch. 9.
[2] "Introduction to Antennas" Martin S Smith, MacMillan, 1988, Ch. 6.

What is claimed is:

1. An antenna arrangement for a cellular radio base station, said arrangement being configurable to service calling mobile stations located in a cell sector, said arrangement comprising:

a main antenna array arranged to discriminate transmitted signals within a plurality of received beam zones occupying an area of said sector, said main antenna being thereby configured to receive communication signals on a plurality of spatially directional beams;

a diversity antenna, arranged to receive signals over a whole of said sector via operation of a full sector received beam;

a diversity receiver arranged to receive a call output signal on one of said beams of said main antenna array and on said diverse antenna beam, said receiver arranged to combine said call output signal from both said beams to provide a diversity call output signal.

2. The antenna arrangement of claim 1, wherein said main antenna receives a said communications signal on one of said plurality of directional beams, said antenna arrangement further comprising means for selecting from between said plurality of beams, a said beam receiving a wanted communications signal.

3. The antenna arrangement of claim 2, further comprising a diversity receiver adapted to combine said wanted communications signal with a communications signal received by said diversity antenna.

4. The antenna arrangement as claimed in claim 1, wherein a said main antenna comprises a plurality of individual antenna elements.

5. The antenna arrangement of claim 1, wherein said diversity antenna comprises a plurality of antenna elements adapted to receive a said communications signal on one or more of a plurality of adjacent diversity beams defined by said plurality of antenna elements.

6. The antenna arrangement as claimed in claim 1, wherein said plurality of directional beams comprise orthogonal beams.

7. The antenna arrangement as claimed in claim 1, wherein said plurality of beams comprise non-orthogonal beams.

8. The antenna arrangement as claimed in claim 1 wherein said plurality of beams are directable in different directions to each other.

9. The antenna arrangement as claimed in claim 2, wherein said means for selecting a beam comprising an optimal signal is common to both said antennas.

10. The antenna arrangement of claim 9, wherein said means for selecting a beam receiving an optimal signal intermittently re-selects said optimal signal.

11. The antenna arrangement of claim 10, wherein said intermittent re-selection comprises testing beams adjacent said selected beam for an optimal signal.

12. An antenna arrangement as claimed in claim 1, wherein said receiver is configured to periodically scan said main antenna array beams so as to locate said output signals and thereafter to compare said signals so as to select one of said signals depending on the comparative signal to noise ratio and signal strength of said output signals; and
handing said call to the beam associated with said selected signals.

13. A method of receiving communications call signals in a cellular radio communications system, the method comprising the steps of:
forming a first plurality of directional narrow uplink beams at a main antenna; receiving communications signals on said first plurality of directional uplink beams;
forming at least one second full sector uplink beam at a diverse antenna; receiving communications signals on said second uplink beam;
periodically scanning across said plurality of first uplink beams to locate a beam receiving an optimal communication signal associated with a given call;
handing said call to said located first uplink beam; and
providing a diversity signal by combining said received signals from said second uplink beam and said located first uplink beam.

14. The method as claimed in claim 13, comprising the step of:
comparing a said communications signal received on a located beam of said first plurality of beams with a said communications signal received on said second uplink beam.

15. The method as claimed in claim 13, comprising the steps of:
forming a plurality of said second uplink beams;
scanning across said plurality of second uplink beams to locate a beam of said second plurality on which said communications signal is optimally received; and
comparing said communications channel received on said first located beam with said communications channel received on said second located beam.

16. An antenna arrangement for a cellular radio system configurable to handle a call from a mobile station, comprising:
a first antenna array capable of receiving first antenna signals;
a first beam forming means capable of receiving said first antenna signals and outputting a plurality of first beam signals corresponding to a first plurality of narrow beams;
a second antenna spaced apart from said first antenna, said second antenna capable of receiving second antenna signals;
a second beam former means capable of receiving said second antenna signals and outputting a second beam signal corresponding to at least one full sector second beam;
locating means for periodically scanning across said plurality of first beam signals to locate a communications signal received on a said beam; and
a receiver for receiving said first and second beam signals so as to hand said call to said located beam; said receiver arranged to combine said second beam signal and said located first beam signal to provide a diversity signal.

17. The antenna arrangement as claimed in claim 16, wherein said locating means operates to select a beam signal corresponding to an optimal receive beam of said first and second directional beams.

18. The antenna as claimed in claim 16, comprising:
means for comparing said first beam signals with said second beam signals.

19. The antenna arrangement as claimed in claim 16, wherein said second antenna comprises a directional antenna capable of receiving communications signals on a second plurality of directional beams.

20. The antenna arrangement as claimed in claim 16, wherein said receiver simultaneously receives a beam signal from each of said plurality of beams, and sequentially scans said beam signals of said plurality of beams.

21. The antenna arrangement as claimed in claim 16, wherein said first and second antennas are physically spaced apart by a distance sufficient that when said first antenna experiences a fade, said second antenna is out of fade.

22. A method of receiving communications call signals in a cellular radio communications system the method comprising the steps of:
receiving first antenna signals on a first antenna array;
inputting first antenna signals into a first beam former means;
outputting from said first beam former means a plurality of first beam signals corresponding to a plurality of narrow beams;
receiving second antenna signals on a second antenna array, said second antenna array spaced apart from said first antenna array;
inputting said second antenna signals to a second beam former means;
outputting from said second beam former means second beam signals corresponding to a full sector beam;
periodically scanning said plurality of narrow beam signals to locate an optimal communications call signal received on a said beam; and
inputting said located narrow beam and said full sector beam signals into a receiver which combines said signals to provide a diversity signal.

23. An antenna arrangement for a cellular radio system configurable to handle a communications call from a mobile station, comprising:
an antenna array capable of receiving signals from a plurality of main narrow uplink beams, and at least one full sector diverse uplink beam, and producing corresponding antenna signals, said main and diverse uplink beams being distinguishable from each other on a polarization basis;
beam former means for receiving said antenna signals and producing a plurality of main beam signals corresponding to said plurality of main narrow beams, and at least one diverse beam signal corresponding to said at least one full sector diverse uplink beam; and
a locating means operating to;
periodically scan across said plurality of main beams signals to identify a beam of said first plurality of main uplink beams on which a communications channel call signal is received;

a receiver means operating to compare said communication signals received on said identified main beam with said communications signal identified on said diverse beam said receiver means being configured to select the main narrow beam having the optimal signal and thereby hand the call to said selected main beam; said receiver combining said selected main beam and said diverse beam signals to provide a diversity signal.

24. The antenna arrangement as claimed in claim 23, wherein said antenna is capable of receiving signals on a plurality of said diverse uplink beams, and said scanning means operates to scan across a corresponding plurality of diverse beam signals to identify a beam of said plurality on which said communications signal is received.

25. A method of receiving communication signals in a cellular radio communications system so as to handle a communications call from a mobile station, the method comprising the steps of:

forming a plurality of main uplink narrow beams, said at least one diverse full sector uplink beam, said main and diverse beams being distinguishable from each other on a polarization basis;

receiving a communications channel signal of said main and diverse uplink beam;

periodically scanning across said plurality of main beams to identify a said beam on which a communications channel call signal is received;

combining said communications channel signal received on a said main identified beam with said communications signals received on a said diverse beam; and handing said call to said identified main beams.

26. The method as claimed in claim 25, wherein said polarizations are mutually orthogonal.

27. The method as claimed in claim 25, comprising the steps of:

forming a plurality of said diverse uplink beams;

scanning across said plurality of diverse uplink beams to identify a said diverse beam on which said communications channel signal is received; and comparing said communications channel signal received on said identified main beam with said communications channel signal received on said identified diverse beam.

28. A method of receiving communications signals from a mobile station in a cellular radio communications call system, said method comprising the steps of;

forming a plurality of main uplink beams;

forming a plurality of diverse uplink beams;

selecting at least, by a periodic scanning process, one beam from said plurality of main uplink beams and said plurality of diverse uplink beams; and inputting said selected at least beam into a receiver so as to hand said call to said selected beam;

wherein said plurality of main uplink beams operate to distinguish signals of a first polarization; and said plurality of diverse beams operate to distinguish signals of a second polarization.

29. A method of receiving communications call signals from a mobile station in a sectorised cellular radio communications system, said method comprising the steps of:

forming a plurality of main uplink narrow beams in a sector;

forming at least one diverse full sector uplink beam in said sector;

serving a said main uplink beam and by monitoring signals received on said main uplink beam monitoring signals received on said diverse uplink beams; and periodically monitoring signals received on at least one said main uplink beam other than said served main uplink beam; and for a given call, handing said call to a main beam determined to receive an optimal call signal; combining said optimal call signal and said diverse signal.

30. The method as claimed in claim 29, wherein said other uplink beams comprise main beams adjacent in azimuth to said served main beam.

* * * * *